United States Patent
Harcrow, Jr.

[11] 3,876,312
[45] Apr. 8, 1975

[54] WATER TURBIDITY MEASURING APPARATUS

[75] Inventor: Larry L. Harcrow, Jr., Tulsa, Okla.

[73] Assignee: Fishmaster Products, Inc., Tulsa, Okla.

[22] Filed: Aug. 13, 1973

[21] Appl. No.: 387,732

[52] U.S. Cl. .............. 356/208; 43/4; 250/573; 356/227; 356/230
[51] Int. Cl. .................. G01n 21/26; G01j 1/42
[58] Field of Search .......... 356/201, 208, 218, 220, 356/226, 227, 228, 230; 43/1, 4; 250/573

[56] References Cited
UNITED STATES PATENTS
2,532,061 11/1950 Glick .................... 356/208
3,319,514 5/1967 McAllister, Jr. ............ 208/
3,659,943 5/1972 Goolsby ................... 356/72

Primary Examiner—Vincent P. McGraw

[57] ABSTRACT

A water turbidity measuring apparatus to determine light level at various depths relative to ambient surface light for determining optimum fishing depth, said apparatus comprising a light sensitive device, a control means for determining and displaying percentage of light present at the light sensitive device with respect to the surface light, flexible cable means connecting control means to the light sensitive device and linear measurement means to determine the depth of the light sensitive device within the water.

2 Claims, 5 Drawing Figures

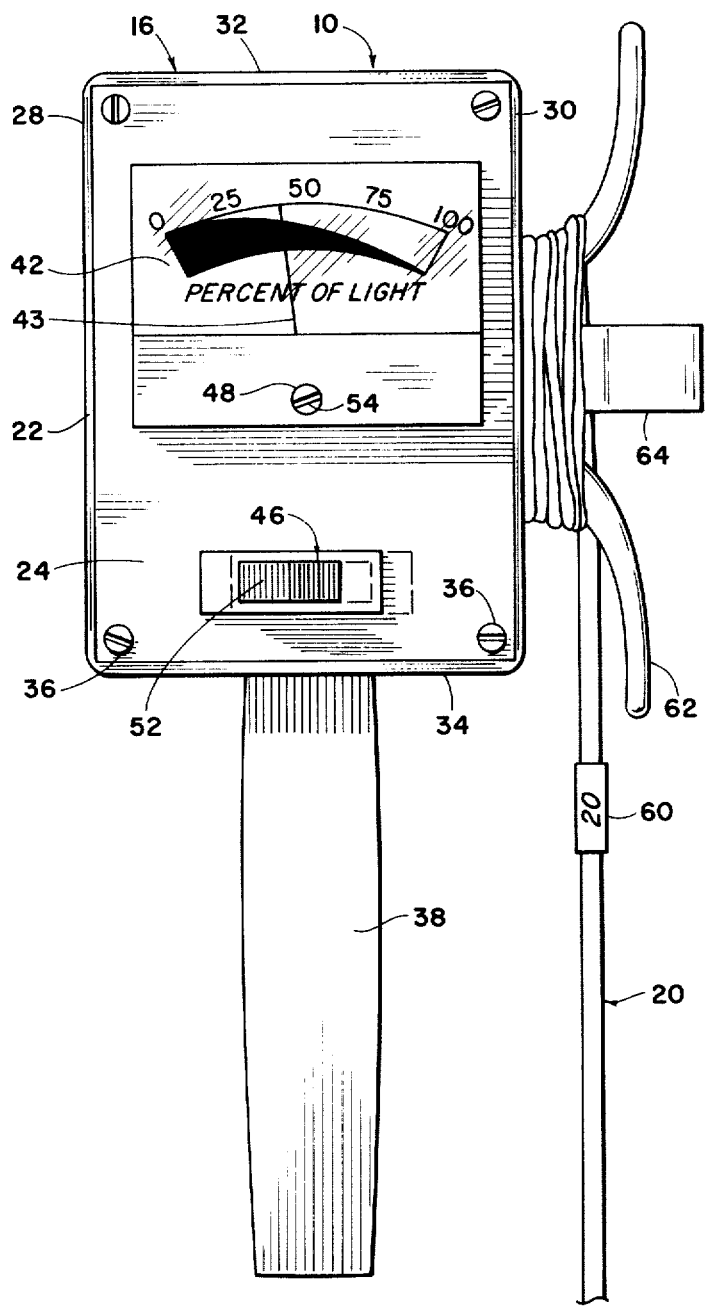
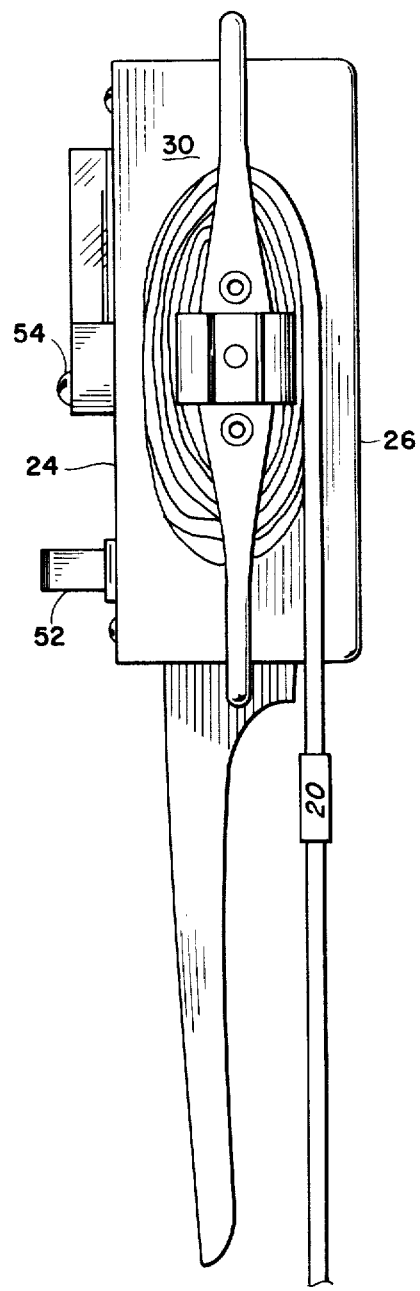
Fig. 1
Fig. 2

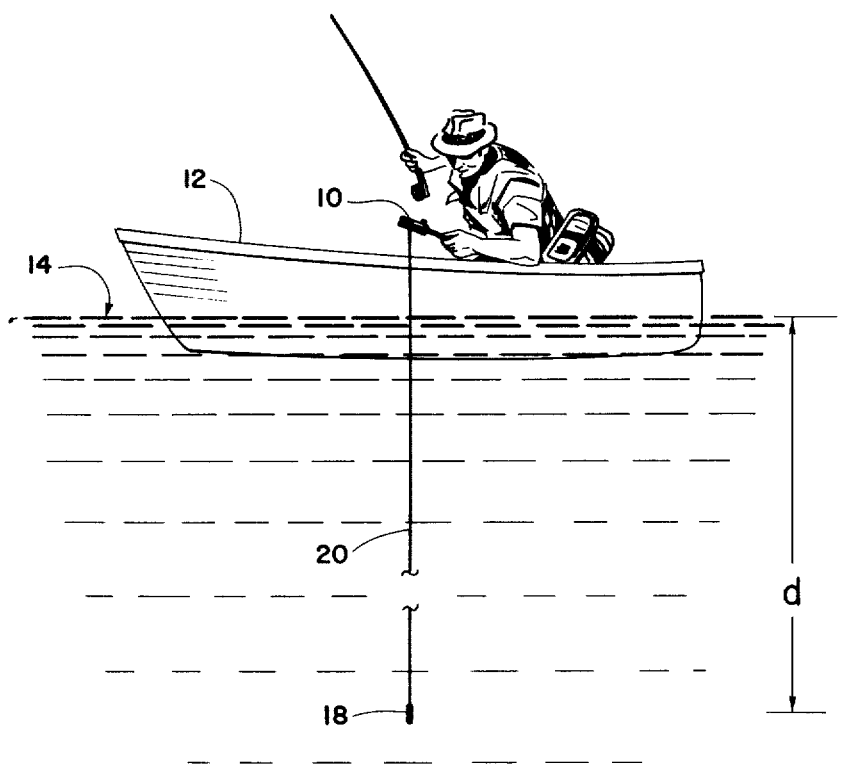
Fig. 3
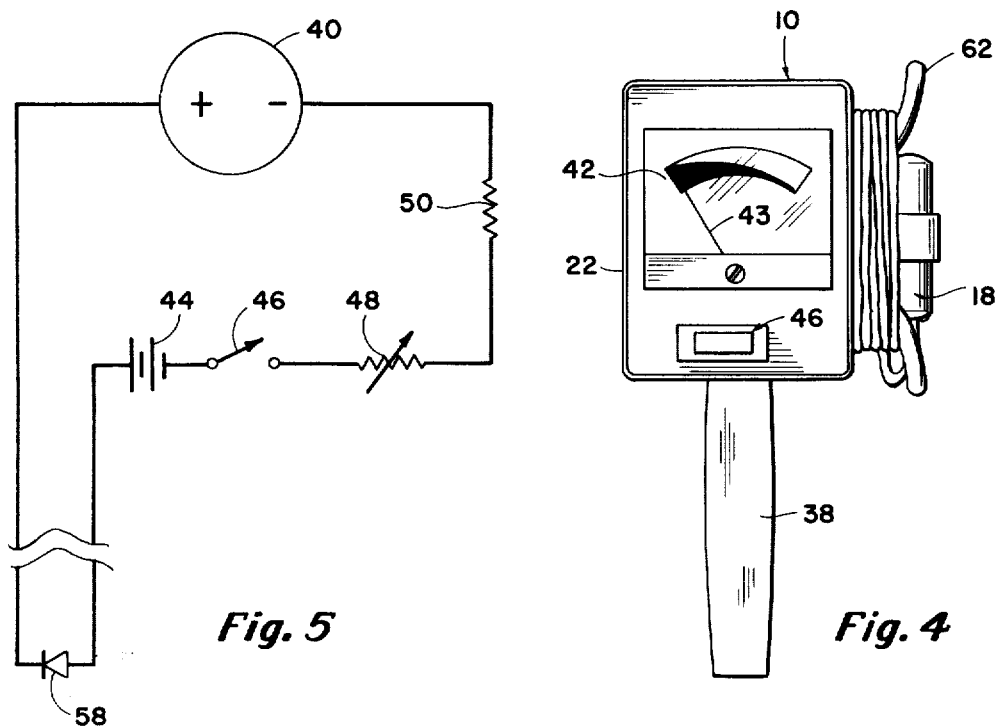
Fig. 5
Fig. 4

WATER TURBIDITY MEASURING APPARATUS

BACKGROUND OF THE INVENTION

1. Field of the Invention.

The present invention relates to fluid turbidity measuring systems and more particularly, but not by way of limitation, to a water turbidity measuring apparatus to determine the light level at various depths of water with respect to the ambient surface light level for determining optimum fishing depth.

2. Description of the Prior Art.

There are many factors which determine at what depth or location fish will naturally choose for their temporary home, such as temperature of the water, locations relative to underwater currents and the like. However, one of the main factors which determine that depth for which fish are most likely to be found is that of penetration of the sun's rays or the amount of available light with respect to the depth of the water. It has been found that fish normally prefer that depth just below the deepest penetration of light rays in the water. This depth varies in the water depending upon water clarity, the angle of the sun, cloudiness of the skies, and smoothness of the water surface.

It has also been noted that some fish prefer a depth wherein a certain percentage of light is available depending upon the type of fish and the time of day.

Heretofore, devices for measuring liquid turbidity have consisted of fairly elaborate and extensive scientific equipment which is particularly designed for a special purpose of measuring haze, smog level, density of impurities and the like. However, these devices would not be effective for measuring the amount of light present at various depths in the water relative to the amount of ambient light at the surface thereof, for the purpose of locating desirable depths for fishing. Moreover, these devices will be prohibitively expensive for the average fisherman and not at all suitable for his needs.

SUMMARY OF THE INVENTION

The present invention provides a novel water turbidity measuring apparatus which is particularly designed and constructed for determining the light intensity level at various depths of water relative to the ambient surface light intensity. The present invention is provided with a light sensitive probe which may be lowered to various depths in the water by means of the flexible cable attached thereto. The opposite end of the flexible cable is secured to and operably connected to control means for determining and displaying the percentage of light present at the various depths of water with respect to the surface ambient light. This controls means comprising a meter having a dial which is graduated from 0 to 100 percent and an ambient surface light adjustment mechanism operably connected to the meter for setting the meter to read one hundred percent when the probe is exposed to the ambient light surface of the water.

The flexible cable is provided with a plurality of spaced graduation markers so that as the probe is lowered into the water, reference to the flexible cable by the user thereof, readily indicates the depth of the probe. As the probe is lowered into the water the user may refer to the meter and determine the percentage of light present at the probe in relation to the various depths of the probe.

It is obvious that the user may directly measure intensity of the light of various depths by calibrating the meter by a standard light source and refraining from adjusting said meter in accordance with the ambient light available at the surface of the water. The photosensitive probe is provided with a weight attached thereto or attached to the flexible cable adjacent to the said probe to insure that the probe will be lowered substantially vertically beneath the boat or dock from where it is being used.

It is well recognized that the change of light intensity with respect to the depth of water or any other fluid is not linear but this may be compensated for by either the placement of the graduations on the meter will be sufficient to allow the fisherman to select the most likely depth for finding fish.

Therefore, it is an object of this invention to provide a water turbidity measuring apparatus which is portable and lightweight and may be used for determining light intensity level at various depths in water relative to the ambient light intensity of the surface of the water in order to locate optimum fishing depths for any particular location.

DESCRIPTION OF THE DRAWINGS

Other objects of the present invention will hereinafter more fully appear in connection with a detailed description of the drawings in which:

FIG. 1 is an elevational view of a water turbidity measuring apparatus embodying the present invention.

FIG. 2 is a side elevational view of the apparatus of FIG. 1.

FIG. 3 is an elevational view of a fisherman in a boat utilizing the water turbidity measuring apparatus.

FIG. 4 is an elevational view of the apparatus of FIG. 1 in a stored position.

FIG. 5 is a circuit diagram of the apparatus of FIG. 1.

DESCRIPTION OF THE PREFERRED EMBODIMENT

Referring to the drawings in detail reference character 10 generally indicates a water turbidity measuring apparatus which may be used by a fisherman from a boat 12 or a dock (not shown) for determining light intensity at a particular depth d in water generally indicated by reference character 14. The turbidity measuring apparatus 10 generally comprises a control unit by an elongated flexible cable generally indicated by reference character 20. The control unit 16 comprises a housing 22 having a front face panel 24, a back panel 26, side panels 28 and 30, a top panel 32 and a bottom panel 34. The side panels 28 and 30, the top and bottom panels 32 and 34 and the back panel 26 may be molded from a single piece of plastic or the like with access to the interior of the housing 22 being provided by the removable face panel 24 which is secured in place by a plurality of screws 36. A handle member 38 may be secured to the housing 22 at any appropriate position and is depicted therein as being secured to the bottom panel 34 thereof. A meter 40 which is current sensitive is secured within the housing 22 and is provided a face 42 positioned in an opening in the face panel 24 and being exposed to the outer surface of the housing 22. A meter indicator needle 43 is pivotally secured to the meter and is exposed to the face 42 thereof.

The control unit 16 also comprises a battery storage cell 44 which is disposed in the housing 22, the negative terminal of the said battery 44 being operably connected to one side of the meter 40 in series with a single pole, single throw switch 46, a variable resistor 48, and a load resistor 50, for a purpose that will be hereinafter set forth. The on-off switch 46 is secured to the face panel 24 and is provided with an operator 52 which extends through the face panel 24 and is adjacent to the handle 38 so that the operator thereof may operate the switch 52 with thumb while holding the control unit by means of handle 38. The operator switch 52 is preferably spring loaded so that the switch 36 is normally opened. The variable resistor 48 is provided with an operator 54 which is disposed on the outer front face of the housing 22 adjacent to the meter face 42 and may be provided as an integral part of the meter 40. The variable resistor 48 is utilized as a meter adjustment device in a manner which will be hereinafter set forth. The load resistor 50 is simply a resistor which is selected to limit the meter current in accordance with the various devices utilized to make up the circuit.

The probe unit 18 generally comprises a lead weight which is secured to one end of the cable 20 and a light sensitive device 58 which is secured to the lead weight 56. The light sensitive device 58 may comprise an ordinary light sensitive diode or preferably comprises a photoamplifier device such as a silicon photo-Darlington amplifier as produced by General Electrics, Part Nos. 2N5777-2N57708 (L14D Series). The light sensitive device 58 is connected in series with the battery 44 and the meter 40. The cable 20 is simply a two wire insulated cable which serves to carry the probe unit 18 on one end thereof for lowering the said probe into the water at various depths. The cable 20 is provided with a plurality of spaced labeled markers 60 which are used for determining the depth of the probe unit 18.

A cable storage bracket 62 is secured to one side of the control unit 16 and is provided with an outwardly extending gripping device 64 for carrying the probe unit therein when not in use. Therefore, when the unit 10 is not in use the cable 20 may be wrapped around the bracket device 62 and the probe unit 18 stored within the gripping device 64 as depicted in FIG. 4.

In operation, when the apparatus 10 is to be used by a fisherman the probe unit 18 is removed from its bracket attachment 64 and if the unit is to be used to determine the light intensity relative to the ambient light of the surface, the light sensitive device 58 is exposed to the ambient surface light and the switch 46 is operated to an on position by means of the thumb operator 52. While the switch 46 is in the on position a screwdriver, coin, or the like (not shown) may be utilized for operating the variable resistor 48 to set the meter indicator needle 43 to the one hundred percent marker on the meter face 42. Then if the fisherman decides to fish at a depth $d$ where the light intensity is, for example, 40 percent of that at the surface, then the probe 18 is lowered until the meter indicator 43 indicates a light level of 40 percent which would in turn indicate that the light intensity at the level of the probe is 40 percent of that ambient light level at the surface of the water 14. The spaced marker 60 on the cable 20 may then be consulted to determine the actual linear depth of the probe within the water 14.

On the other hand, if the user desires to locate a depth in the water corresponding to a specific intensity level he may expose the light sensitive device 58 to a standard light source and adjust the variable resistor 48 so that the meter reads 100% under that specific light source. The user may then lower the said probe 18 into the water to a depth wherein the intensity will register a specific reading on the dial face 42 thereby indicating the desired light intensity level.

From the foregoing it is apparent that the present invention provides a novel water turbidity measuring apparatus which is particularly designed and constructed for determining light intensity levels at various depths for determining optimum depths for locating fish. The novel turbidity measuring apparatus is economical and durable in construction and simple and efficient in operation.

Whereas, the present invention has been described in particular relation to the drawings attached hereto, it is understood that other further modifications apart from those shown or suggested herein may be made within the spirit and scope of this invention.

What is claimed:

1. A water turbidity measuring apparatus for determining light intensity level at various depths of water, for determining optimum fishing depths and comprising:

weighted light sensitive photoamplifier probe;
   portable light weight control means for determining and displaying light intensity at the probe, said means comprising a housing having probe storage means attached thereto, meter carried by the housing for displaying light intensity level at the probe, adjustment means operably connected to the meter for adjusting said meter in accordance with a reference light source and power cell carried by the housing and operably connected to the meter;
   flexible cable means having a plurality of spaced linear measurement markers secured therealong, said cable means being operably connected between the probe and the control means for operably connecting the said probe in series with the power cell and the marker.

2. A water turbidity measuring apparatus as in claim 1 wherein the meter is graduated from 0 to 100 percent for representing the percentage of light at the probe relative to the reference light source.

* * * * *